May 22, 1962 J. K. STONE 3,035,717
SHIFTABLE STALL STRUCTURES FOR PARKING AUTOMOBILES
Filed Jan. 27, 1961 2 Sheets-Sheet 1
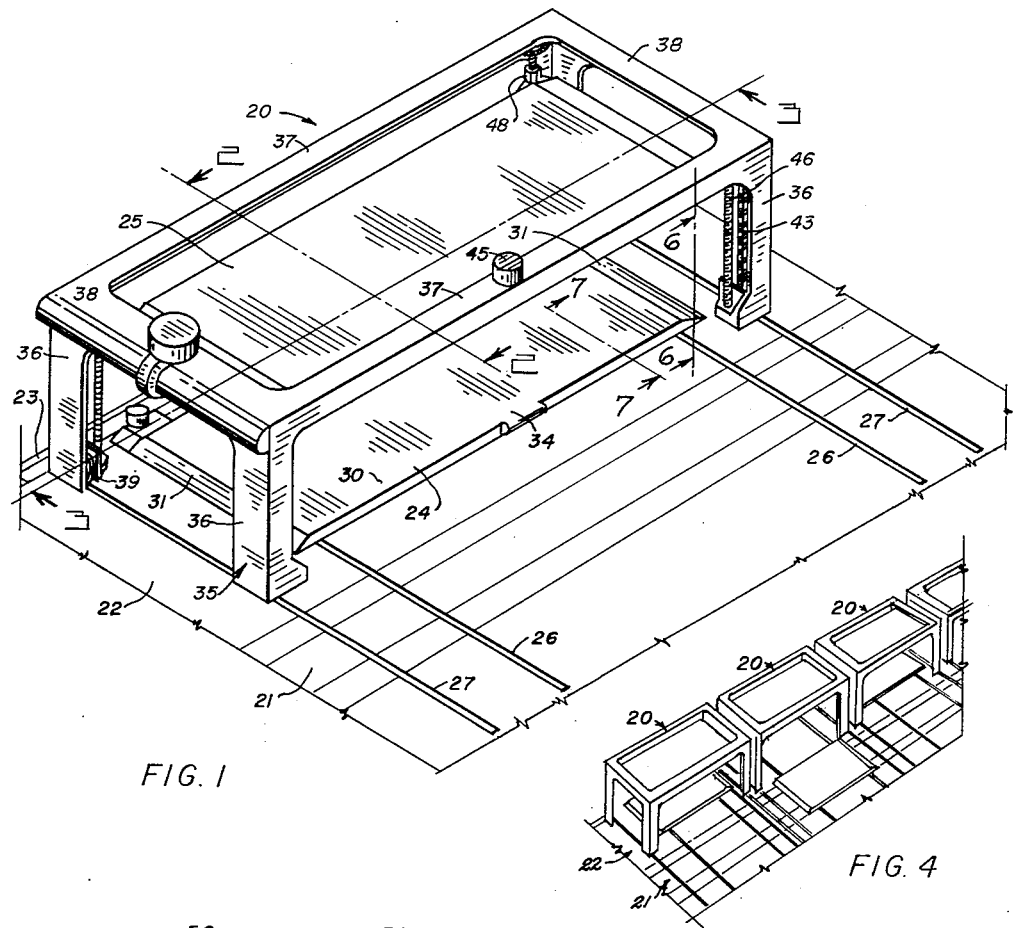
FIG. 1
FIG. 4
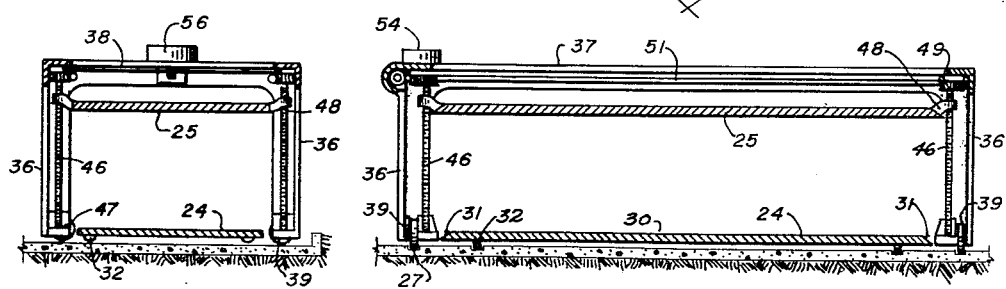
FIG. 2
FIG. 3
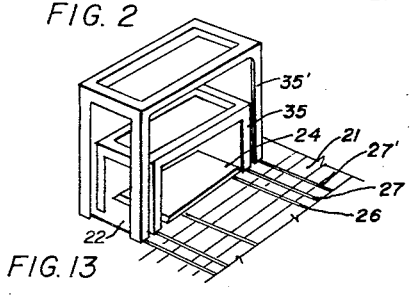
FIG. 13
INVENTOR.
John K. Stone
BY
WHITEHEAD, VOGL & LOWE
ATTORNEYS May 22, 1962    J. K. STONE    3,035,717
SHIFTABLE STALL STRUCTURES FOR PARKING AUTOMOBILES
Filed Jan. 27, 1961    2 Sheets-Sheet 2
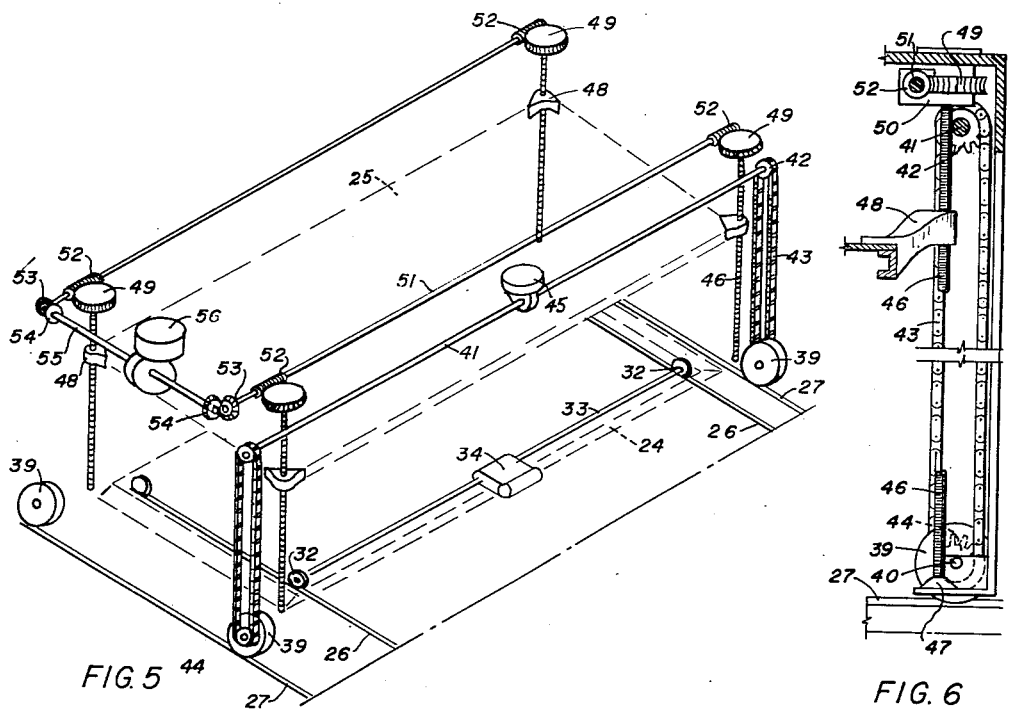
FIG. 5    FIG. 6
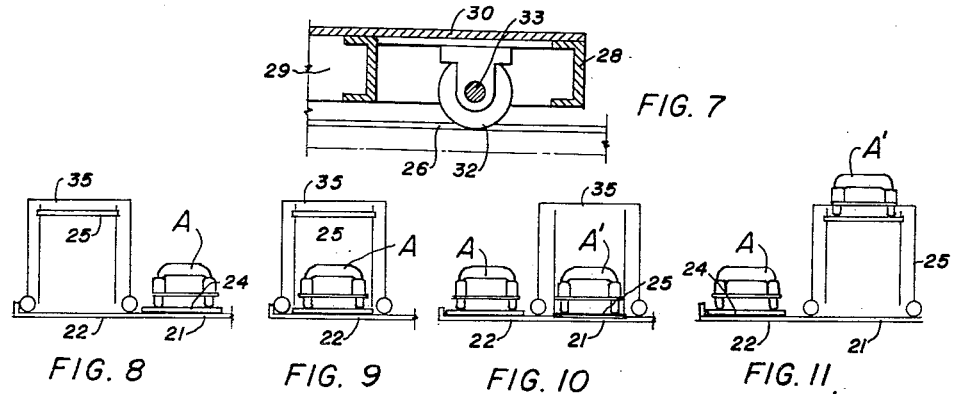
FIG. 7
FIG. 8    FIG. 9    FIG. 10    FIG. 11    FIG. 12
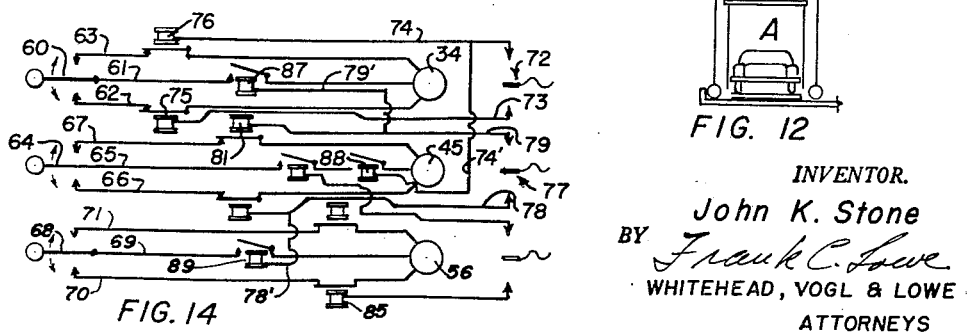
FIG. 14
INVENTOR.
John K. Stone
BY Frank C. Lowe
WHITEHEAD, VOGL & LOWE
ATTORNEYS

United States Patent Office 3,035,717
Patented May 22, 1962

3,035,717
SHIFTABLE STALL STRUCTURES FOR
PARKING AUTOMOBILES
John K. Stone, 136 W. 13th Ave., Denver, Colo.
Filed Jan. 27, 1961, Ser. No. 85,246
3 Claims. (Cl. 214—16.1)

This invention relates to the parking and storage of automobiles and more particularly to stall structures for parking automobiles in rows and tiers.

A primary object of the invention is to provide a novel and improved stall structure for parking automobiles in rows and in tiers which is formed as a plurality of shiftable stall units arranged in a compact and efficient manner. As such, the units which constitute the invention will be hereinafter referred to as shiftable stall structures for parking automobiles, or simply as shiftable stalls.

Another object of the invention is to provide a novel and improved shiftable stall for parking an automobile which is adapted to receive the automobile from an access lane at one side of the stall, to shift the automobile laterally, into the stall space for parking it, and to ultimately return it to the access lane.

Another object of the invention is to provide a novel and improved system of shiftable stalls for parking automobiles in compact rows and tiers alongside an access lane which is especially adapted for use in narrow parking lots and in similar narrow locations where parking space alongside the access lanes is limited.

Another object of the invention is to provide a novel and improved system of shiftable parking stalls and improved stall units therefor which park automobiles in tiers, one over the other, and which is especially adapted for curb or parallel parking in congested streets where parking space is at a premium.

Another object of the invention is to provide a novel and improved shiftable parking stall which is so easy to operate that it may be equipped with a simple push-button system to be used and operated by the general public.

Yet other objects of the invention are to provide a novel and improved shiftable parking stall for automobiles which is simple in construction, economical, neat appearing and may be built as a rugged and durable unit.

With the foregoing and other objects in view, all of which more fully hereinafter appear, my invention comprises certain novel and improved constructions, combinations and arrangements of parts and elements as hereinafter described, defined in the appended claims and illustrated in the accompanying drawing in which:

FIGURE 1 is an isometric view of a two-tier shiftable parking stall constructed according to the principles of my invention and with the stall being disposed alongside an access lane.

FIGURE 2 is a transverse sectional elevational view, as from a vertical plane intersecting the indicated line 2—2 at FIG. 1.

FIGURE 3 is a longitudinal, sectional elevational view, as from a vertical plan intersecting the indicated line 3—3 at FIG. 1.

FIGURE 4 is an isometric view of a plurality of shiftable stall units arranged in tandem alongside an access way, such as illustrated at FIG. 1 but on a reduced scale and with one of the units having a vehicle-supporting deck extending into the access lane.

FIGURE 5 is an isometric, diagrammatic skeleton view of a preferred arrangement of mechanisms adapted to drive the apparatus.

FIGURE 6 is an enlarged fragmentary, sectional detail of a corner portion of the apparatus, as taken substantially from the indicated line 6—6 at FIG. 1.

FIGURE 7 is an enlarged fragmentary, sectional detail as taken substantially from the indicated line 7—7 at FIG. 1.

FIGURES 8 through 12 are representative diagrams of the apparatus to illustrate one sequence of operation of the apparatus to move vehicles from the access lane and into the parking stalls of the apparatus.

FIGURE 13 is an isometric view similar to FIG. 1 but on a greatly reduced scale and illustrating, in a diagrammatic manner, a three-tier unit constructed according to the invention.

FIGURE 14 is a diagram of an operative circuit which may be used in connection with the shiftable parking stall.

The present invention was developed to meet several parking problems which are not as yet satisfied. Basically, the problem of parking automobiles in a garage or in a lot with efficiency involves not only the need for handling a maximum number of vehicles for the space available but also the need for handling the automobiles in a selected stall quickly and without having to move other vehicles in doing so, and further, to return any automobile from its stall quickly and without the need for moving a number of other vehicles to make way for the one being returned. While many systems of storing and parking automobiles in rows and tiers have been devised none adequately copes with these two problems. Actually, the device to store a maximum number of automobiles in a given space is practically the antithesis of storing automobiles in a manner which permits the operator to remove an automobile from its stall without having to move several other vehicles. There also exists many vacant lots in congested areas which are comparatively narrow, usually not more than 25 feet wide which, while being ideally located for parking lots, are nevertheless too narrow to be operated as a parking lot. Also, at many locations, offstreet parking is not available and there is not sufficient lane space at the sides of the streets for handling the parking needs of heavy traffic.

To meet such problems, the present invention comprises, in essence, a parking stall system using a tandem-arranged group of shiftable stall units alongside a single, narrow access lane. Each unit is adapted to support automobiles in tiers, one above the other.

Referring more particularly to the drawing, the improved shiftable stall 20, illustrated at FIG. 1, is adapted to park two automobiles, one over the other. The stall is especially adapted to be located alongside an access lane 21 and an automobile will be shifted laterally from the lane and into the stall for parallel parking therein. Such stalls may be ideally located in the parking lane 22 of a roadway, alongside the curbing 23 with the access lane 21 being that section of a roadway alongside the parking lane. The stalls may also be located in a parking lot in a parking lane 22 at an edge of the lot as against a boundary curb 23 with the access lane 21 being in the lot. Such an arrangement is especially desirable for narrow, deep lots. A lot 25 feet wide may have a central access lane and a parking lane at each side thereof and with the improved shiftable stalls, park a surprising number of automobiles therein.

Moreover, while the stall construction is hereinafter described as being a two deck unit, as illustrated at FIG. 1, it is within the purview of the invention to provide for multiple deck units such as the triple deck unit 20a illustrated at FIG. 13 as hereinafter described.

The stall construction illustrated at FIG. 1 includes a lower deck 24 and an upper deck 25 whereon automobiles are parked. These decks are transversely mobile to move into out of the access lane and they are wheel-mounted to move on transversely disposed sets of guideways 26 and 27, respectively, which are inset in the pavement constituting the parking lane 22 and the access lane 21.

The lower deck 24 remains at the ground level. It consists of a flat framework of any suitable construction, such as longitudinally disposed channels 28, lateral members 29 and a cover plate 30 as illustrated at FIG. 7. It also includes sloping ends 31 to facilitate moving an automobile upon it. This deck is mounted upon wheels 32 which lie in the guideways 26. Other structural details of this deck are not shown since it may be arranged in any of several conventional ways.

A drive means is provided for moving this lower deck 24 back and forth, as from the parking position, in the parking lane 22, and outwardly into the access lane 21. A suitable means may be used to effect this movement. For example, a common drive shaft 33 connects the wheels at one edge of the deck, as in the manner indicated in the schematic drawing at FIG. 5. This shaft 33 is driven by a suitable reversible motor 34 of any compact type which may be mounted at the side of the lower deck and which is powered sufficiently to rotate the wheels 32 on the shaft in unison to thereby move the deck along the guideways 26 to and from the access way.

The upper deck 25 of the stall 20 is formed as a rectangular platform similar in construction to the lower deck to receive and support an automobile on it in the same manner. However, it is mounted in an open-top, rectangular, table-like framework 35. This framework 35 sets over the lower deck 24 in the parking lane. It includes a leg 36 at each corner, and suitable longitudinal side beams 37 and end beams 38 at the top of the legs complete the framework. This framework is mounted upon wheels 39, which are carried upon suitable axles 40, at the base of each leg 36, with the wheels being in the upper deck guideways 27 to permit the framework to shift laterally as from the parking lane 22 to the access lane 21 and back. The framework 35 is driven by a suitable powered means similar to the means adapted to drive the lower deck 24. A drive shaft 41 extends longitudinally across the machine alongside a side beam 38 and each end of this shaft is mounted in a corner of the framework 35 in suitable bearings, not shown. A sprocket 42 is affixed to each end of this shaft 41, and a chain 43 extends downwardly from each drive shaft sprocket 42 alongside a leg 36. This chain 43 connects to a sprocket 44 on the axle 40 of the wheels at the base of the leg. The shaft 41 is driven by a suitable reversing motor 45 of any compact type which may be mounted on the side beam 37 and which is powered sufficiently to rotate the shaft 41 and the sprockets, chains and wheels connected thereto and to thereby drive the framework to and from the access way 21. Whenever the framework is moved outwardly into the access lane, the upper deck 25 is adapted to be lowered from a normal upper position near the top of the framework to the ground surface at the access way. After receiving an automobile from the access way, it may be again raised to the upper position, and the framework returned to the parking lane 22. A preferred mechanism for the raising and lowering of this upper deck includes a synchronized lead screw arrangement at each corner of the framework. A vertically disposed lead screw 46 is mounted in suitable thrust bearings 47 at each leg corner. A threaded ear 48 is affixed to each corner of the deck and is connected to a lead screw. A means is provided for rotating all four lead screws in unison, and as in the construction illustrated at FIG. 5, a worm wheel 49 is positioned at the top of each drive screw in suitable bearings 50. A drive shaft 51 is located at each side of the framework and carries a worm gear 52 near each end which is also mounted in the bearing 50 and is connected to the worm wheels 49. Each longitudinal shaft 49 extends beyond the worm gear at one end to carry a bevel gear 53 at its end. This gear 53, in turn, is connected with another bevel gear 54 near an end of a transverse shaft 55, which is located at one end of the unit. It follows that this arrangement operatively interlocks the four worm wheels 49 so that they rotate in unison to raise and lower the upper deck 25. The actual operation is accomplished by a suitable motor 56 which is connected to the transverse shaft 55 at the center of the unit as illustrated.

The actual mode of operation of the shiftable stall may vary considerably and it may be operated by various mechanisms and controls, the motors 34, 45 and 56 being illustrative of one preferable arrangement. Equivalent moving means such as pistons may also be used. Moreover, the controls may be a simple manually operated array of switches or valves, if a hydraulic system is used, or more elaborate and even semi-automatic or fully automatic systems may be used.

FIGURE 14 illustrates one preferred arrangement of electrical controls of a type which includes suitable interlocks to restrict operation of the shiftable stall to one deck at a time. Each motor 34, 45 and 56 is suitably powered by circuits not shown and each includes forward and reversing starting circuits. The motor 34 for driving the lower deck is operated by a two-way switch 60, the blade of which is connected to a central lead 61. The switch may be shifted one direction to connect with an extension lead 62 which closes circuits to operate the motor to move the lower deck 24 from the parking lane 22 to the access lane 21. It may be shifted the other direction to connect with a return lead 63 which closes circuits to operate the motor to return the lower deck 24 from the access lane to the parking lane.

The motor 45 for driving the framework 35 is operated by a two-way switch 64 which is connected to a central lead 65 and which connects with an extension lead 66 when shifted one direction and a return lead 67 when shifted the other direction. These connections operate the motor to extend and return the framework 35 from the parking lane 22 to the access lane 21 and back.

The motor 56 for lowering and raising the upper deck 25 is operated by a two-way switch 68 which is connected to a central lead 69 and which connects with a lowering lead 70 when shifted one direction and a raising lead 71 when shifted the other direction.

An interlocking system is used to prevent simultaneous operation of the upper and lower components of the apparatus. The system includes a double limit switch 72 which closes to energize an extended lead 73 when the lower deck is moved to the extended position in the access lane and also closes to energize a retracted lead 74 when the lower deck is returned to the parking lane 22. When the extended lead 73 is energized it opens a normally closed relay 75 having its switch in the extension lead 62, and this action stops the extension movement of the lower deck. When the retracted lead 74 is energized it opens a normally closed relay 76 in the return lead 63 to stop the return movement of the lower deck.

The system also includes a second double limit switch 77 which closes to energize an extended lead 78 when the framework 35 is moved to its extended position in the access lane, and also closes to energize a retracted lead 79 when the framework is returned to the parking lane 22. When the extended lead is energized it opens a normally closed relay 80 having its switch in the extension lead 66 to stop the extension movement of the framework. When the retracted lead 79 is energized it opens a normally closed relay 81 in the return lead 67 to stop the return movement of the framework.

A third double limit switch 82 is provided which closes to energize a lowered lead 83 when the upper deck 25 is lowered and also closes to energize a raised lead 84 when the upper deck is fully raised. When the lowered lead 83 is energized it opens a normally closed relay 85 having its switch in the lowering lead 70 to stop the lowering movement of the deck. When the raised lead 84 is energized it opens a normally closed relay 86 having its switch in the raising lead 71 to stop the raising movement of the deck.

A normally open interlocking relay 87 has its switch in the central lead 61 of the lower deck controls and this relay is energized by a branch 79' of the retracted lead 79. Thus, the circuits operating the lower deck 24 are inoperative except when the framework 35 is in its retracted position in the parking lane 22 and the limit switch 77 is energizing the retracted lead 79.

A normally open interlocking relay 88 has its switch in the central lead 65 of the framework controls and this relay is energized by a branch 74' of the retracted lead 74. Thus, the circuits operating the framework are inoperative except when the lower deck 24 is in its retracted position in the parking lane 22 and the limit switch 72 is energizing the retracted lead 74.

A third normally open interlocking relay 89 has its switch in the central lead 69 of the upper deck vertical controls and this relay is energized by a branch 78' of the extended lead 78. Thus, the circuits operating the lowering and raising of the upper deck 25 are inoperative except when the framework 35 is at its extended position in the access lane 21 and the limit switch 77 is energizing the extended lead 78. A fourth normally open interlocking relay 90 has its switch in the central lead 65 of the framework controls, in series with the relay switch 88, and this relay is energized by a branch 84' of the raised lead 84. Thus, the circuits operating the framework are also inoperative except when the upper deck 25 is at its raised position and the limit switch 82 is energizing the raised lead 84.

One mode of actual operation of the apparatus is graphically illustrated at FIGS. 8 through 12. FIGURE 8 illustrates the lower deck 24 as being moved into an access lane 21 to receive an automobile A. FIGURE 9 illustrates the lower deck as being returned to the parking lane 22 to store the automobile A. At FIG. 10, the framework 35 is moved to the access lane 21 and the upper deck is lowered to receive a second automobile A'. FIGURE 11 shows a further step of the sequence, the raising of the upper deck and FIG. 12 shows the final step of returning the framework 35 to the parking lane 22 to store the automobile A'. From this stored position either automobile can be returned to the access lane without disturbing the other, but no mix-up can occur because of the interlocking arrangement of controls as hereinbefore described.

A number of other ways may be used to operate this apparatus and it is especially useful where a deep, narrow lot is used, one side may be the access lane 21 and the other side a parking lane 22 to hold a row of stall units, as illustrated at FIG. 4. If the lot is wider, the access lane may be located at the center and tiers of stall units may be positioned in the parking lanes at each side of the access lane. With this arrangement, recovery of any parked vehicle from a stall and to the access lane is quick and simple.

While the invention is herein described as a two level unit, it is obvious that a tri-level unit can be easily formed by the use of a second, modified framework 35' which is slightly larger and higher than the framework 35, as clearly illustrated at FIG. 13. It is obvious that many other alternate and equivalent constructions can also be devised and built, all of which are within the scope and spirit of my invention. Hence, I desire that my invention be limited, not by the constructions illustrated and described, but only by the proper scope of the appended claims.

I claim:

1. In a shiftable parking stall for shifting vehicles laterally from a parking lane to an access lane and back, of the general type including an inward and an outward transversely disposed guideway at each end of the stall location extending from the parking lane to the access lane, a ground level lower deck mounted on each inward guideway and being adapted to shift laterally from one lane to the other along the path formed by the inward guideways, an open elevated framework having a leg member at each end mounted in an outer guideway and being adapted to shift laterally from one lane to another along the path formed by the outer guideways an upper deck carried in the framework adapted to be lowered and raised within the framework and a driving means adapted to move the lower deck from one lane to the other, to move the elevated framework from one lane to the other and to raise and lower the upper deck; a control means adapted to control the driving means operative by circuits having individual double acting switches including:

(a) a first switch adapted to shift in one direction to move the lower deck from the parking lane to the access lane and to shift the other direction to move the lower deck from the access lane to the parking lane, (b) a second switch adapted to shift one direction to move the framework from the parking lane to the access lane and to shift the other direction to move the framework from the access lane to the parking lane, (c) and a third switch adapted to shift one direction to lower the upper deck and to shift the other direction to raise the upper deck, (d) a first limit switch means circuited with the first said double acting switch adapted to stop the movement of the lower deck when it shifts to a position fully within the access lane and when it shifts to a position fully within the parking lane, (e) a second limit switch means circuited with the second said double acting switch adapted to stop the movement of the framework when it shifts fully into the access lane and when it shifts fully into the parking lane, and;

(f) a third limit switch means circuited with the said third double acting switch adapted to stop the movement of the upper deck when it is completely lowered and when it is completely raised.

2. In the organization set forth in claim 1, a normally open switching means in the circuits of the first said double-acting switch adapted to normally prevent movement of the lower deck and an interlock means associated with the said second limit switch adapted to close the normally open switchway means whenever the framework is moved to its position in the packing space.

3. In the organization set forth in claim 1, a first, second and third normally open switching means in the respective circuits of each of said double-acting switches adapted to normally prevent movement of the lower deck, framework and upper deck, respectively, a first interlock circuit associated with the first said switching means and with the second said limit switch and being adapted to energize to close the first said switching means whenever the framework is moved to its position in the parking lane whereby to permit operation of the lower deck, a second interlock circuit associated with the said second switching means and with the first said limit switch and being adapted to energize to close the second said switching means whenever the lower deck is moved to its position in the parking lane whereby to permit operation of the framework, and a third interlock circuit associated with the third said switching means and with the second said limit switch and being adapted to energize to close the third said switching means whenever the upper deck is moved to its position in the access lane whereby to permit operation of the upper deck.

References Cited in the file of this patent
UNITED STATES PATENTS 2,765,932    Nielsen _____ Oct. 9, 1956
2,826,312    Francis _____ Mar. 11, 1958